Nov. 3, 1942.  S. GUARNASCHELLI  2,300,547
FLEXIBLE HOSE CONNECTION
Filed Sept. 22, 1941
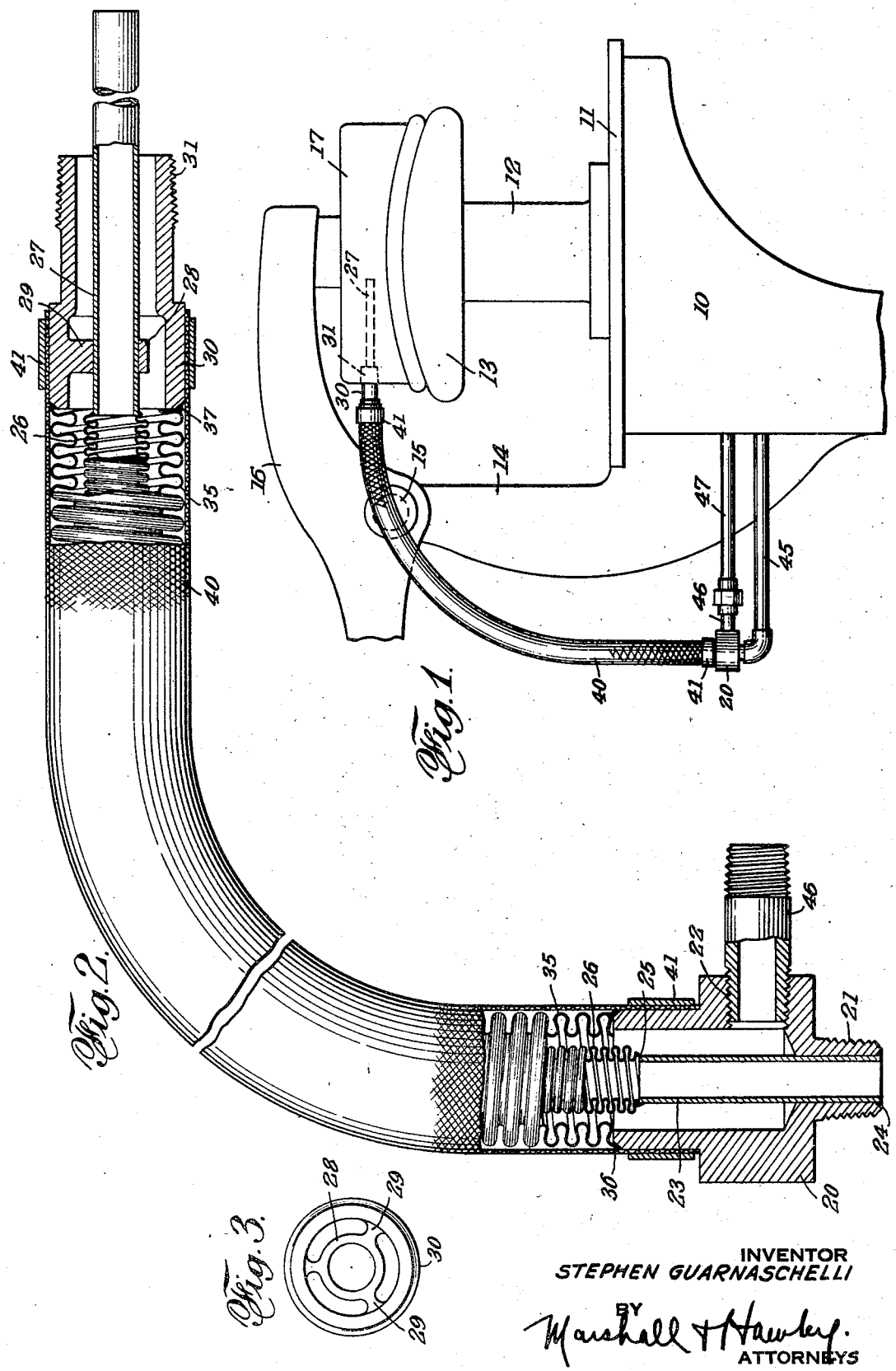
INVENTOR
STEPHEN GUARNASCHELLI
BY
Marshall & Hawley.
ATTORNEYS Patented Nov. 3, 1942

2,300,547

UNITED STATES PATENT OFFICE 2,300,547

FLEXIBLE HOSE CONNECTION

Stephen Guarnaschelli, Mount Vernon, N. Y., assignor to Packless Metal Products Corporation, New York, N. Y., a corporation of New York Application September 22, 1941, Serial No. 411,799

5 Claims. (Cl. 285—22)

This invention relates to a flexible hose connection for steam bucks or like machines.

It is necessary for the operation of pressing machines that steam be conducted to the steam buck for the heating and pressing operation and that the spent steam or condensate be drained from the buck.

The steam buck is usually mounted on a lever arm and is adapted to swing through an arc vertically into operative relation to the stationary pressing member or shoe. It is customary to employ one hose for the live steam and a separate hose for the drain. The operation of the steam buck flexes the hose whenever the buck is raised or lowered.

This invention has for its salient object to provide a simple, practical and efficient flexible hose connection for conducting steam to and drainage from a pressing machine or steam buck.

Another object of the invention is to provide a multi wall hose for a live steam and drainage connection to a pressing machine, so constructed and arranged as to prevent buckling of the inner hose or conduit when the hose is flexed upon the raising and lowering of the movable pressing member or steam buck.

Further objects of the invention will appear from the following specification taken in connection with the drawing which forms a part of this application and in which Fig. 1 is an elevational view partly broken away showing a portion of a pressing machine and a hose connected thereto constructed in accordance with the invention;

Fig. 2 is an end elevational view of the inner end connector of the hose connection.

In the particular embodiment of the invention illustrated, the invention has been shown in connection with a pressing machine although it should be understood that it is not limited to this particular use.

As shown in the drawing, there is illustrated a pressing machine comprising frame 10 having a table 11 and a support 12 thereon for a cushion or pad 13 which forms the stationary pressing member.

A bracket 14 is carried by the frame and has pivoted thereto at its upper end, as shown at 15, a lever 16 on which is mounted at one end a steam buck 17. The other end of the lever is connected to suitable operating mechanism by means of which it can be raised and lowered.

The steam buck 17 has a steam chamber therein to which live steam is conducted. The spent steam or drainage or condensate is removed from the side of the buck nearest the pivot 15 when the buck is raised or swung upwardly by the lever 16.

The hose connection involving the invention has been worked out particularly for conducting live steam to the steam chamber of the buck 17 and for moving the spent steam or condensate therefrom. This connection is illustrated in detail in Fig. 2.

The hose connection is provided at one end with a connector or coupling member 20 having an externally threaded plug or end portion 21 and having an internally threaded opening 22. A metallic tube or pipe 23 extends through the plug 21 and is connected thereto as by brazing as shown at 24. The other end of the tube 23 is connected at 25 to a flexible metallic hose 26 which may be spiral or corrugated hose. At its other end the flexible metallic hose 26 is connected to a pipe or tube 27 which is slidably mounted in a guide or sleeve 28 connected by webs 29 to a coupling member 30. The outer end of the member 30 is threaded, as shown at 31, and the tube 27 extends outwardly through the coupling member.

A second flexible metallic hose 35 is connected at 36 to the coupling member 20 and at 37 to the coupling member 30. This hose 35 is similar to the hose 26, but is larger in diameter and encloses the smaller hose, as shown in the drawing. The outer hose 35 is preferably surrounded by a flexible metallic braid or sheath 40 which is secured at its ends to the coupling members 20 and 30, being clamped thereto by suitable clamping means 41.

In use the hose connection above described has the end 21 connected to a pipe 45 which in turn is connected to the live steam supply line. The threaded opening 22 has threaded thereinto a nipple 46 which in turn is connected to a drain pipe 47. Although it is preferred to connect the inner conduit to the steam supply and to use the outer conduit for the drain pipe, these connections might be reversed if desired.

At its other end the hose connection has the threaded end 31 of the coupling member or connector 30 threaded into the wall of the steam buck 17 and the tube or pipe 27 extends into the steam chamber of the buck, thus the live steam is conducted to the steam chamber through the inner conduit comprising the tube 23, flexible metallic hose 26 and tube 27. The drainage or condensate leaves the steam chamber or steam buck through the coupling member 30, outer flexible metallic hose 35 and passageway through the connector 20, nipple 46 and drain pipe. Expansion and contraction of the inner hose or conduit is permitted by means of the slidable support of the tube or hose 27 in the sleeve 28. Thus, when the hose connection is flexed there is no buckling of the inner hose within the outer hose, but freedom of movement is permitted.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A multiple hose connection for use in connecting a fixed and a movable member, comprising a pair of spaced, coaxial hose sections, a connector at one end having conduits leading to said sections, a connector at the other end having a conduit communicating with the outer hose section and a conduit extending outwardly through said last named conduit and connected to the inner hose section, said inner conduit being slidably mounted in said second connector.

2. A multiple hose connection for use with a pivotally mounted steam buck, comprising a pair of spaced, coaxial hose sections, a connector at one end having conduits leading to said sections, a connector at the other end having a conduit communicating with the outer hose section and a conduit extending outwardly through said last named conduit and connected to the inner hose section, said inner conduit being mounted for longitudinal movement in the second connector.

3. A multiple hose connection for use with a pivotally mounted steam buck, comprising a pair of spaced coaxial, flexible, metallic hose sections, a connector at one end having conduits leading to said sections, a connector at the other end having a conduit communicating with the outer hose section and a conduit extending outwardly through said last named conduit and connected to the inner hose section, said inner conduit being slidably mounted in said second connector.

4. A multiple hose connection for use in connecting a fixed and a movable member, comprising a pair of spaced coaxial hose sections, a connector at one end having conduits leading to said sections, a connector at the other end having a conduit communicating with the outer hose section and a conduit extending outwardly through said last named conduit and connected to the inner hose section, and means in the outer conduit for movably supporting the inner conduit in spaced relation in said outer conduit.

5. A multiple hose connection for use with a pivotally mounted steam buck, comprising a pair of spaced, coaxial hose sections, a connector at one end having conduits leading to said sections, a connector at the other end having a conduit communicating with the outer hose section and a conduit extending outwardly through said last named conduit and connected to the inner hose section, and means in the outer conduit for supporting the inner conduit in spaced relation and for relative axial movement in said outer conduit.

STEPHEN GUARNASCHELLI.